UNITED STATES PATENT OFFICE.

EDMUND STIASNY, OF HEADINGLY, ENGLAND, AND OTTO SCHMIDT, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

TANNING.

1,203,069. Specification of Letters Patent. Patented Oct. 31, 1916.

No Drawing. Application filed March 23, 1914. Serial No. 826,790.

*To all whom it may concern:*

Be it known that we, EDMUND STIASNY and OTTO SCHMIDT, citizens of the Austro-Hungarian and German Empires, respectively, residing at Headingly, Leeds, England, and Ludwigshafen-on-the-Rhine, Germany, have invented new and useful Improvements in Tanning, of which the following is a specification.

We have discovered that we can obtain a good leather by treating hides with a class of compounds which have hitherto not been employed for this purpose. This new class of compounds is characterized by the following properties: All the bodies, which can be used according to the present invention, are water-soluble aromatic compounds of a non-crystalline character, which are practically free from diphenyl-methane compounds and from sulfone groups, contain hydroxyl in the molecule, but not more than one hydroxyl group in each nucleus, contain at least two aromatic nuclei combined in the molecule by at least one atomic group or polyvalent atom, contains at least one acid salt-forming group besides the hydroxyl group, and in the form of their free acids are capable of precipitating glue, or gelatin, from solutions thereof.

The following are examples of how this invention may be performed, but the invention is not confined to these examples. The parts are by weight.

Example 1: Neutralize, by means of caustic soda, a concentrated solution of the product obtained by acting with sulfur-monochlorid ($S_2Cl_2$) on sulfonated cresol and then dilute with water till the solution is of about five per cent. strength. Then tan, in the usual way, with this preparation. The leather obtained is not colored, but otherwise it resembles very closely leather prepared with the aid of vegetable tanning agents. The tanning agent mentioned in this example can be prepared, for instance, as follows: Heat 239 parts of cresol with 261 parts of concentrated sulfuric acid till sulfonation is finished, then cool the mass and pour into it slowly, drop by drop, at ordinary temperature, and while stirring well, 150 parts of sulfur monochlorid ($S_2Cl_2$). When hydrochloric acid ceases to be evolved, pour the mass onto ice, dilute the reaction liquid with water, and boil until the sulfur has separated out. Then filter off the sulfur. The solution can, if necessary, be evaporated down.

Example 2: Dissolve 100 parts of the body termed thionaphthol sulfonic acid B (obtainable according to the specification of German Patent No. 50,077 and to which we attribute the constitution:—

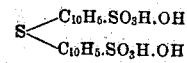

or

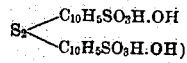

in 2000 parts of water, and use this solution for tanning as directed.

Example 3: Warm together, for ten hours, at 100° C., 94 parts of phenol, 100 parts of 98% sulfuric acid and 46 parts of glycerin. Allow the mass to cool, and pour it onto ice, and filter it. The filtrate contains an easily soluble, and strongly acid, body containing phenolic hydroxyl and sulfonic acid groups. Then nearly neutralize the solution with caustic soda, and dilute with water until a solution of 2° Baumé is obtained. Then introduce the well-limed and bated skins and proceed with the tanning, gradually raising the strength of the solution to 4° Baumé. In this way a soft, full, coarse-grained leather is obtained. Products obtained by the action of glycerin on phenol sulfonic acid can also be used in a similar manner for tanning purposes.

Example 4: Prepare a solution of the urea of 2-amino-5-naphthol 7-sulfonic acid and employ this solution for tanning purposes, whereupon a hard leather is obtained with a good grain and possessing very good resistance to tearing.

Now what we claim is:—

1. The process of tanning which consists in treating hides with a water-soluble aromatic compound of a non-crystalline character, which is practically free from diphenyl-methane compounds, and from sulfone groups, and which contains hydroxyl in the molecule, but not more than one hydroxyl group in each nucleus, and in which at least two aromatic nuclei are combined in the molecule by at least one atomic group or polyvalent atom, and which contains at least one acid salt-forming group besides the hydroxyl group, and which, in the form of its free acid, is capable of precipitating glue and gelatin from solutions thereof.

2. The process of tanning which consists in treating hides with a soluble aromatic compound, obtainable by treating sulfonated cresol with sulfur mono-chlorid.

In testimony whereof we have hereunto set our hands in the presence of two subscribing witnesses.

EDMUND STIASNY.
OTTO SCHMIDT.

Witnesses to the signature of Edmund Stiasny:
CHARLES E. TAYLER,
DORA H. GIBSON.

Witnesses to the signature of Otto Schmidt:
J. ALEC. LLOYD,
S. S. BERGER.